3,362,429
SECOND STAGE PRESSURE REGULATOR WITH EXTERNAL MEANS FOR ADJUSTING THE POSITION OF THE DEMAND LEVER
Nicholas T. Volsk, Costa Mesa, Calif., assignor to W. J. Voit Rubber Corp., a corporation of California
Filed Nov. 5, 1964, Ser. No. 409,147
4 Claims. (Cl. 137—494)

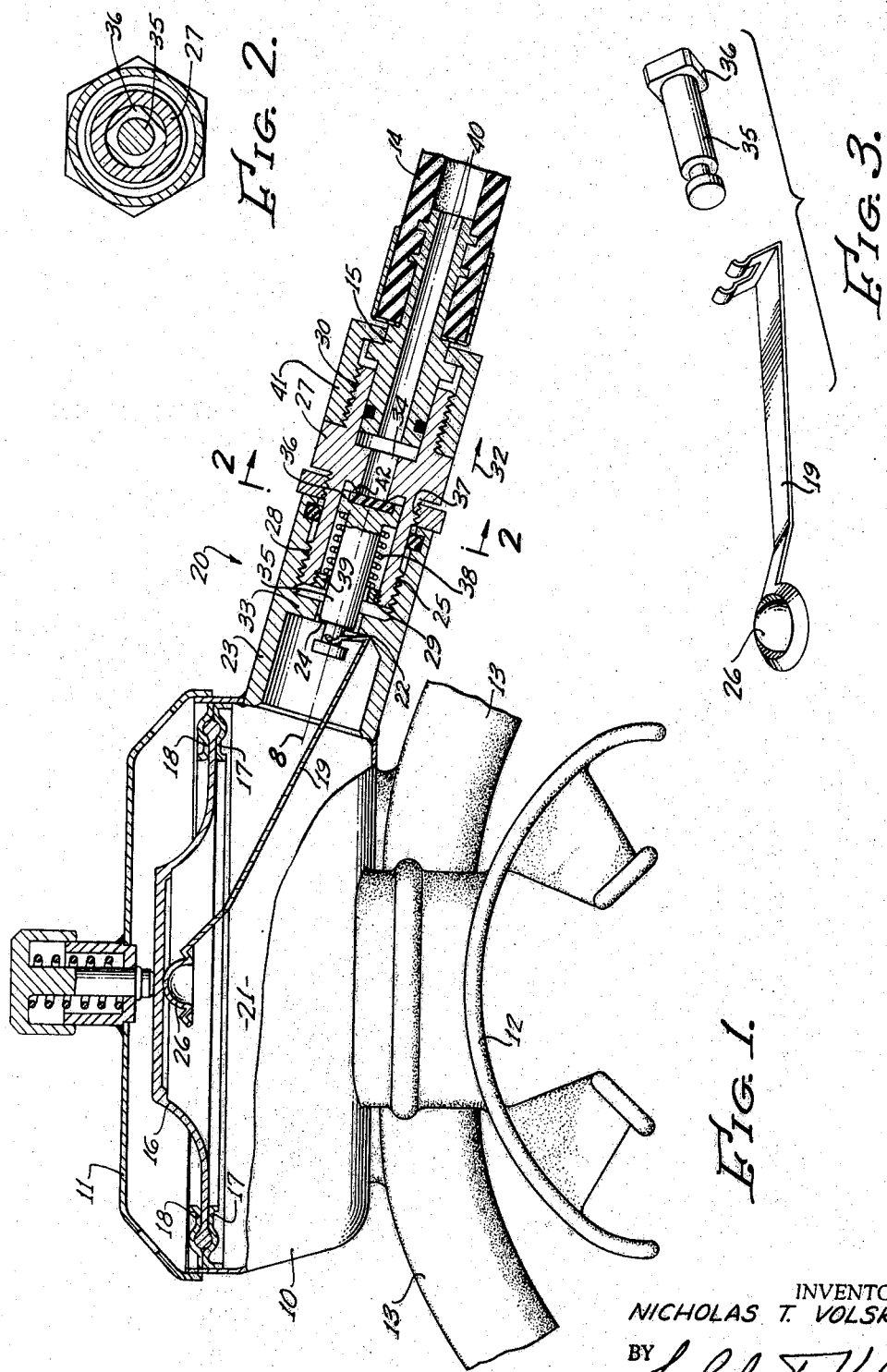

ABSTRACT OF THE DISCLOSURE

A pressure regulator including external means for adjusting the angular position of the demand lever arm so that it properly contacts the regulator diaphragm. The regulator also includes means for adjusting the force required to open and close the regulator independent of the lever arm adjustment.

---

This invention relates to pressure regulators and more particularly to regulators used with self-contained underwater breathing apparatus known as scuba.

The regulators of the above type are known as first and second stage regulators. The first stage reduces the pressure from 2400–2600 p.s.i. to about 120 p.s.i. and the second stage reduces it to the pressure equal to ambient water pressure so that the pressure of air furnished to the diver is always equal to the pressure of water surrounding the diver. In this manner the diver is pressurized to the ambient pressure of water by the air furnished to him by scuba.

This invention discloses a novel second stage regulator and more particularly a regulator having an external means for adjusting the angular position of the demand lever arm so that it properly contacts the regulator diaphragm. The mechanism for adjusting the angular position of the demand lever arm is so arranged that its operation for making the demand lever arm contact the regulator diaphragm does not affect the step down pressure produced and maintained by the regulator nor does it affect its sensitivity.

The regulator is also provided with means for adjusting the magnitude of the force required to open and close the regulator and in this manner the sensitivity of regulator, this latter adjustment being entirely independent of the demand lever arm adjustment.

It is therefore an object of this invention to provide a second stage pressure regulator having external means for adjusting the angular position of a demand lever arm without affecting the sensitivity of the regulator.

It is an additional object of this invention to provide a regulator having the above features and also having means for adjusting the sensitivity of the regulator by either increasing or decreasing the pressure exerted on the regulator valve by a regulator valve spring.

Other objects and advantages will appear from the description of the embodiment of the invention and from the appended claims.

FIGURE 1 is a longitudinal sectional view of the regulator;

FIGURE 2 is a transverse section of the regulator valve in a plane 2—2 illustrated in FIGURE 1;

FIGURE 3 is a perspective view of the demand lever arm and of the valve opened and closed by the lever arm as they are used in the regulator illustrated in FIGURE 1.

Referring to FIGURES 1 to 3, the regulator includes a casing 10, a cover 11, a mouthpiece 12, an exhaust duct 13, a high-pressure hose 14 connected to a connector 15, a diaphragm 16 attached to casing 10 by means of two flanges 17 and 18, a demand lever arm 19 normally engaging the central part of the diaphragm 16 and a valve assembly 20 operated by the demand lever arm 19 so as to close or open the valve interposed between the high pressure hose 14 and an air chamber 21 defined by casing 10 and diaphragm 16. The valve assembly 20 includes a housing 23 welded with its inner end to casing 10. Housing 23 is provided with a baffle 33 having a central bore 24. Housing 23 is provided with a thread 25 which is used for rotating a threaded plug 27 either in a clockwise or counterclockwise direction to obtain a contact between a hemispherical projection 26 at the inner end of arm 19 and diaphragm 16. Such adjustment of the angular position of arm 19 and contact of arm 19 with diaphragm 16 is obtained by means of thread 28 at the inner end of plug 27. Thread 28 engages thread 25 on bushing 23 and is used for moving plug 27 in or out of bushing or housing 23 which in turn rotates arm 19 in the clockwise direction around a pivot point 22 when plug 27 is moved out of bushing 23, in the direction of an arrow 32, by unscrewing the plug, and in the counterclockwise direction around pivot 22 when plug 27 is screwed into bushing 23. Plug 27 is provided with a hexagonal nut 41 for facilitating the rotation of plug 27. Plug 27 is provided with a valve seat 42 and a central duct 34 which supplies air to the regulator from a first stage regulator and air cylinder not shown in the drawings. Mounted in plug 27 is a valve member including a valve stem 35 and a valve head 36 provided with a circular recess for accommodating an elastomeric valve washer 37 which normally rests on top of seat 33 and thus keeps duct 34 closed so that no air flows through hose 14 and duct 34 to the regulator chamber 21. A coil spring 38 and a spring retainer 39 keep valve head 36 and washer 37 in a leak-proof engagement with seat 33. Spring retainer 39 is provided with a thread along its outer periphery which engages thread 29 in plug 27. Spring retainer 39 is used to hold spring 38 within the tubular front portion of plug 27, and it is also used for adjusting the pressure exerted on the valve head 36, washer 37 and on seat 33 by washer 37. This pressure is adjusted to the exact value by using manometers for measuring the air pressure in duct 34 at the time spring retainer 39 is screwed into plug 27. In this manner the sensitivity of the regulator is adjusted to the desired value on a test bench before the valve assembly is coupled to the regulator casing 10. Once the compression of spring has been adjusted by means of nut 39, and the valve assembly inserted into bushing 23 and its position and the position of the lever arm 19 adjusted so that it makes contact with the diaphragm 16, the position of plug 27 is locked with respect to the bushing 23 by means of a locking member which completes the assembly of the regulator. Hose 14 then is connected to plug 27 by means of a threaded nut 41.

What is claimed as new is:
1. In a pressure regulator for underwater breathing apparatus, the combination comprising:
   a casing having an inlet and an outlet,
   a pressure responsive diaphragm mounted across the upper portion of said casing opposite the outlet,
   means biasing said diaphragm in a direction towards said outlet,
   a lever arm having one end portion engaging the diaphragm on the side opposite said resilient means, and another end portion having an angular pivot portion and mounting means at the end of said angular portion,
   a housing mounted at the inlet portion of the casing and having a recessed portion including a baffle having a sloping internal face which engages the pivot portion of the lever arm forming a fulcrum therefor and an aperture extending axially therethrough,
   a resiliently biased valve member slidably mounted in the baffle aperture and having the lever arm mount- ing means coupled thereto for reciprocation of the valve member upon rotation of said lever arm about the fulcrum, and a plug having an aperture extending axially therealong to permit the flow of air to the regulator casing and having a valve seat for engagement by the valve member to arrest flow therethrough, said plug being adjustably coupled to the housing and mounting the valve member for movement therewith in order to move said valve stem back and forth within the baffle aperture thereby adjusting the angular position of the lever arm without affecting the sensitivity of the regulator.

2. A pressure regulator according to claim 1 further including:

a spring mounted about said valve member, a spring retainer mounted to the plug and in engagement with said spring to maintain said spring in position within the plug, said spring retainer being normally mounted within the plug to provide a predetermined pressure on the valve member, said valve member having an intermediate portion of enlarged diameter extending through the baffle aperture and axially within the plug, and a head portion at the other end engaging the valve seat on the plug to regulate the passage of air through the plug to the regulator casing.

3. A pressure regulator in accordance with claim 1 further including:

locking means mounted about said plug to lock the plug in position with reference to the housing.

4. A pressure regulator in accordance with claim 1 wherein:

the valve member comprises a cylindrical portion at the end extending through the baffle aperture, and a portion of the reduced diameter adjacent the cylindrical portion having the lever arm mounting means connected thereto.

References Cited

UNITED STATES PATENTS

| | | | |
|---|---|---|---|
| 2,263,611 | 11/1941 | Carnes | 137—505.46 XR |
| 2,886,033 | 5/1959 | Gagnan et al. | 128—147 |
| 2,906,288 | 9/1959 | Young | 137—505.42 XR |
| 3,149,631 | 9/1964 | Svenson | 128—142 |
| 3,207,175 | 9/1965 | Pauly | 137—505.46 |

WILLIAM F. O'DEA, *Primary Examiner.*

R. GERARD, *Assistant Examiner.*